(12) United States Patent
Canela Viñas

(10) Patent No.: US 6,811,160 B2
(45) Date of Patent: Nov. 2, 2004

(54) TOOL-HOLDER FIXTURE

(75) Inventor: Alexandre Canela Viñas, Badalona (ES)

(73) Assignee: Eines Canela, S.A. (ES)

(*) Notice: Subject to any disclaimer, the term of this patent is extended or adjusted under 35 U.S.C. 154(b) by 95 days.

(21) Appl. No.: 10/328,111

(22) Filed: Dec. 23, 2002

(65) Prior Publication Data

US 2004/0032096 A1 Feb. 19, 2004

(51) Int. Cl.$^7$ ............................................. B23B 31/171
(52) U.S. Cl. ........................................... 279/72; 279/71
(58) Field of Search ........................ 279/22, 30, 71–73

(56) References Cited

U.S. PATENT DOCUMENTS

| | | | | |
|---|---|---|---|---|
| 893,960 A | * | 7/1908 | Saunders | 279/7 |
| 2,063,344 A | * | 12/1936 | Schneider | 279/72 |
| 6,554,290 B2 | * | 4/2003 | Lin | 279/72 |

* cited by examiner

Primary Examiner—Daniel W. Howell
Assistant Examiner—Luke Parsons
(74) Attorney, Agent, or Firm—Lackenbach Siegel, LLP

(57) ABSTRACT

An improved tool-holder fixture, more specifically for tool holders, pincer holders and mill holders, designed for the mounting and dismounting thereof, which comprises a cage body (1) constituting the main support body for a needle bearing (2), a cover (3), a roller cage (4), rollers (5), a top cover (6) and screws (7) for fastening same. The cage body (1) comprises a stepped through-hole within which the needle bearing (2) and the cover (3) are housed, while the cage (4) is received in the interior of the hole and on top of the needle bearing (2) and the cover (3), the latter two components facilitating the smooth rotation of roller cage (4), the rollers (5) being suitable to be received in the cavities defined between the cage (4) and the cage body (1), the latter element having, machined therein, plural half-moon-shaped cavities that serve as ramps for the rollers (5), the top cover (6) being disposed in the upper portion of the unit and being fastened directly to the cage body (1) by means of the screws (7).

2 Claims, 6 Drawing Sheets

TOOL-HOLDER FIXTURE

The present invention has as its subject matter an improved tool-holder fixture, in all versions thereof, both fixed and orientable, which contributes to its performance various advantages that are recited hereinbelow, in addition to others inherent in its arrangement and constitution.

More specifically, the invention concerns a device for mounting tool holders, pincer holders and mill holders in general, designed for mounting and dismounting same.

BACKGROUND OF THE INVENTION

It is known that in order to mount the tool holders, pincer holders and mill holders in general that are used in milling machines and lathes, whether manual or numerically controlled, it is necessary to grip said elements in a fixture of some kind so that they can be manipulated.

Various systems have been developed heretofore, all of them employing mechanisms that are complex or of limited usefulness.

BRIEF DESCRIPTION OF THE INVENTION

To eliminate the disadvantages deriving from the use of the conventional systems known at present, in the improved tool-holder fixture of the invention the gripping of the tool holders, pincer holders and mill holders in general is effected with utmost precision and safety, the whole employing a rational, simple mechanism that gives rise to the corresponding economic advantages.

In its general outlines, the device comprises a part with a cavity that has the approximate shape and measurements of the tool holder, pincer holder or mill holder. This cavity contains a mechanized part within which are housed rollers that operate to grip the tool holder, pincer holder or mill holder by traveling.

To complement the description that follows and to help provide a better understanding of its characteristics, the description is accompanied by a set of drawings whose figures show the most significant details of the invention for illustrative and non-limiting purposes.

DESCRIPTION OF AN EXEMPLARY EMBODIMENT OF THE INVENTION

Turning now to the figures commented on and referring to the numbering used, an exemplary embodiment of the invention consisting of an improved tool-holder fixture can be seen therein.

Figure 1A:
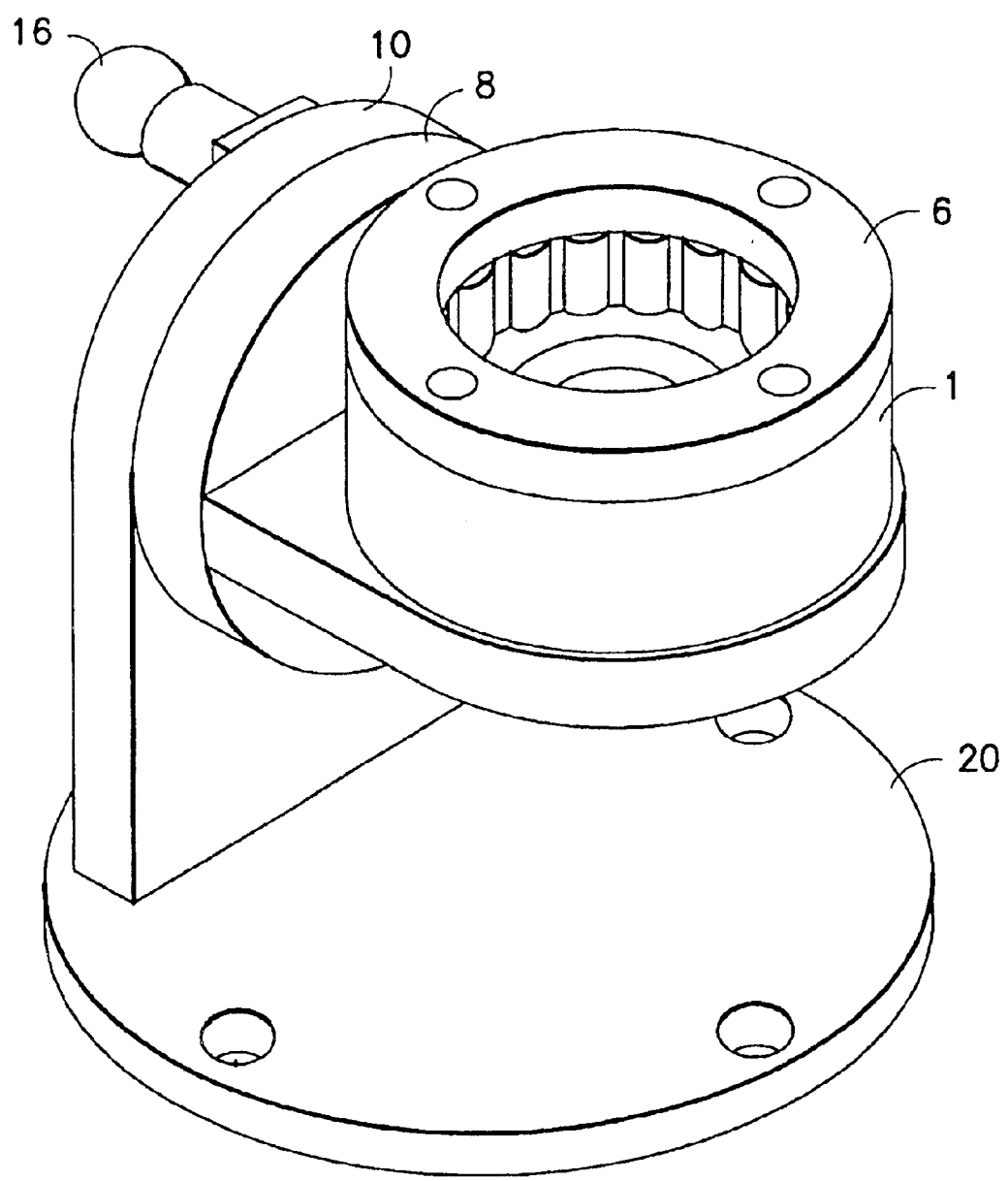
FIG. 1a is a perspective view illustrating the device of the invention fully mounted.
Figure 1B:
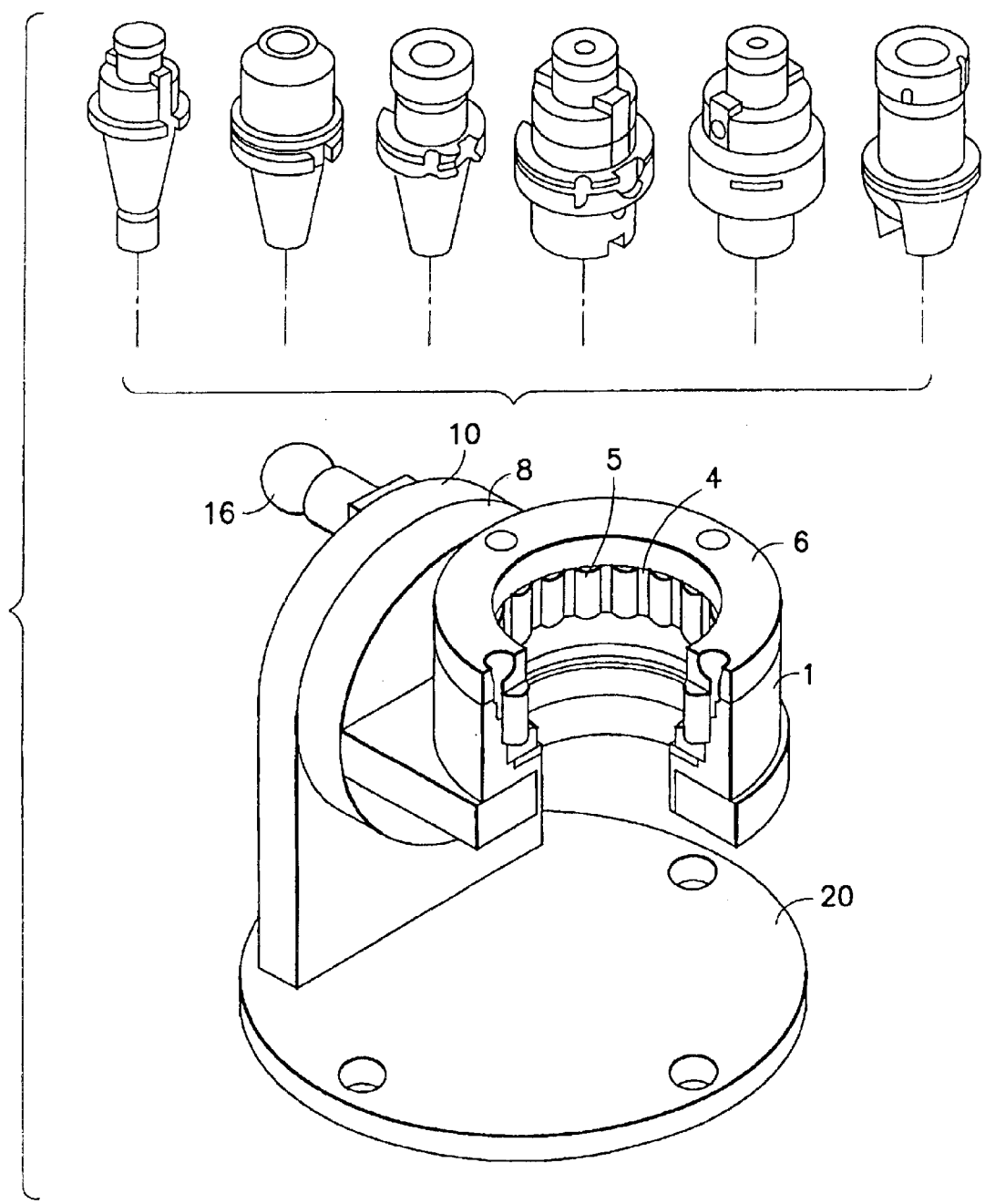
FIG. 1b is a sectional perspective view of said device, as well as a variety of the tool holders, pincer holders and mill holders in general for which it was designed.

FIG. 1 illustrate the construction of a multi-purpose fixture that can be used to mount all commercially available tool holders, pincer holders and mill holders in general, owing to its peculiarity of securing them by their upper portion instead of by the lower portion, as in the case of those currently on the market.

Figure 2:
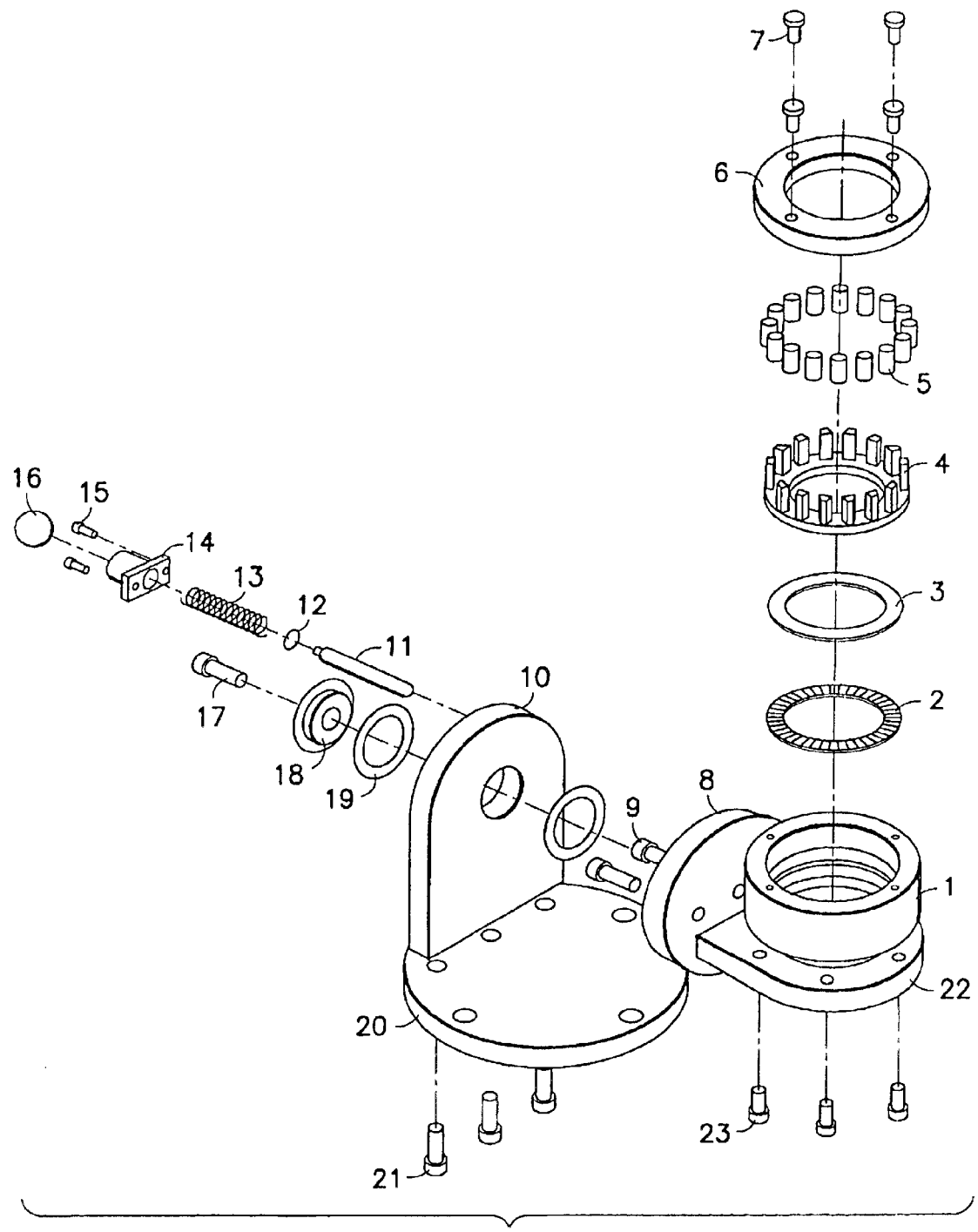
FIG. 2 is an exploded perspective view of the aforesaid device.
Figure 3:
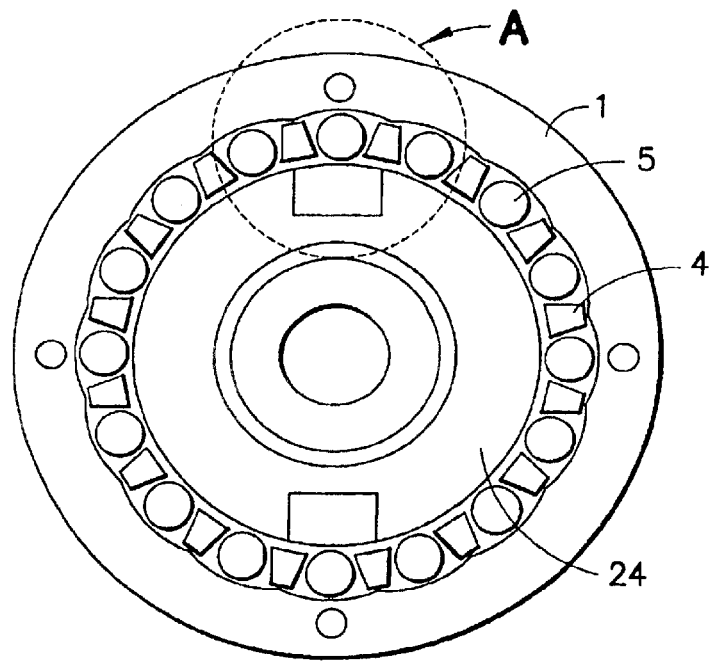
FIGS. 3, 4 and 5 show the roller-actuated locking system implemented by the device of the invention.
Figure 4:
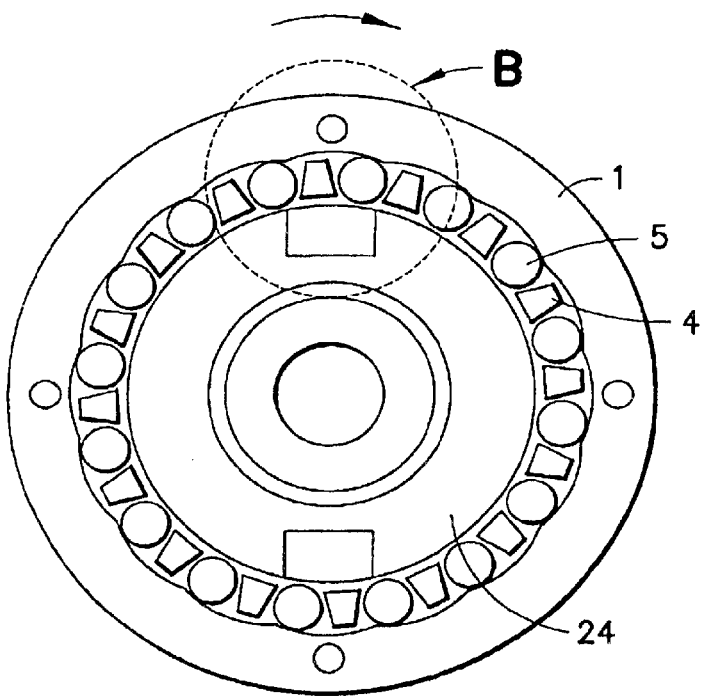
Figure 5:
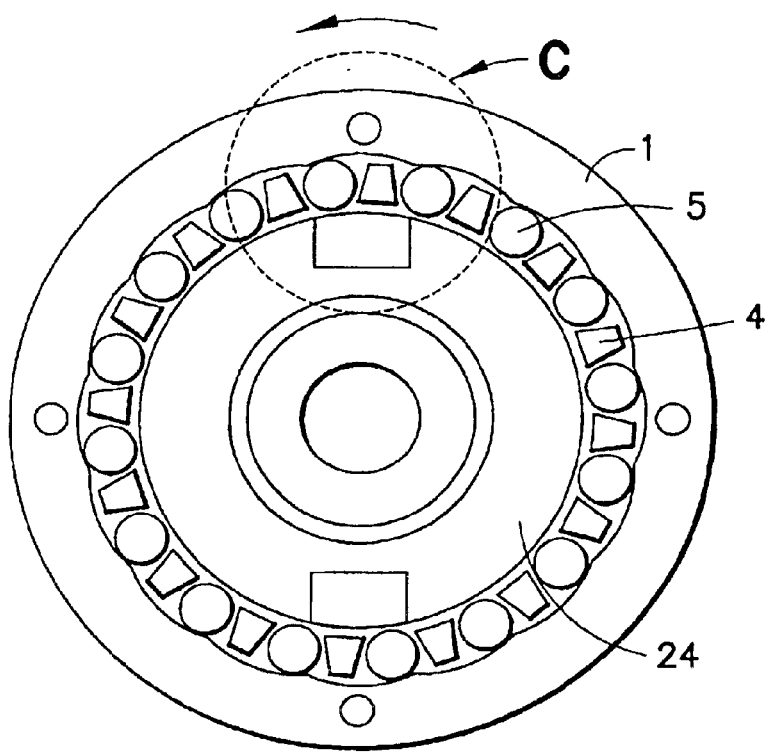
Figure 6:
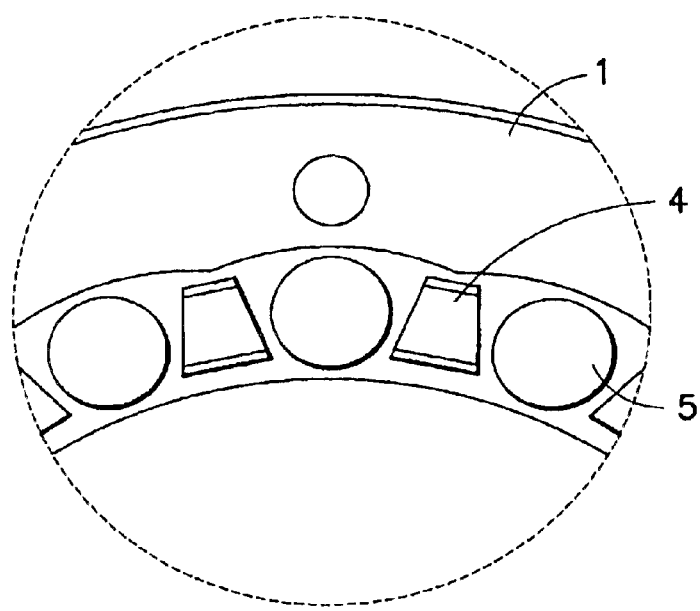
FIGS. 6, 7 and 8 show respective details of the previous FIGS. 3, 4 and 5, indicated therein by the letters A, B and C.
Figure 7:
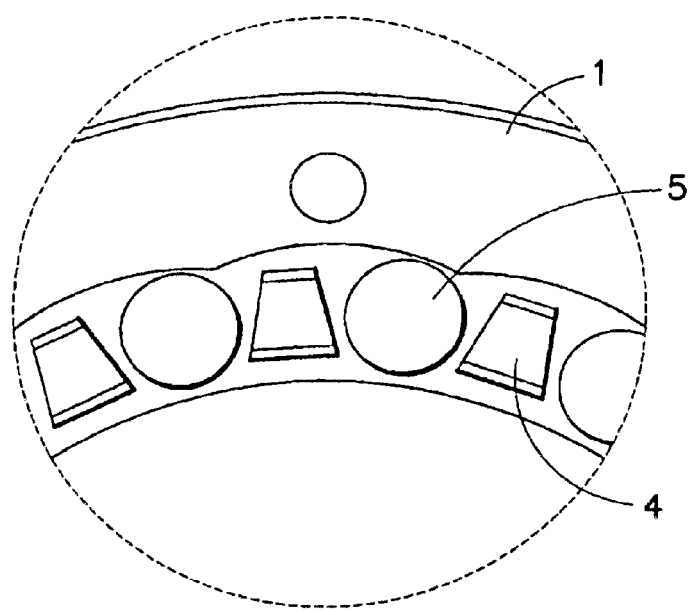
Figure 8:
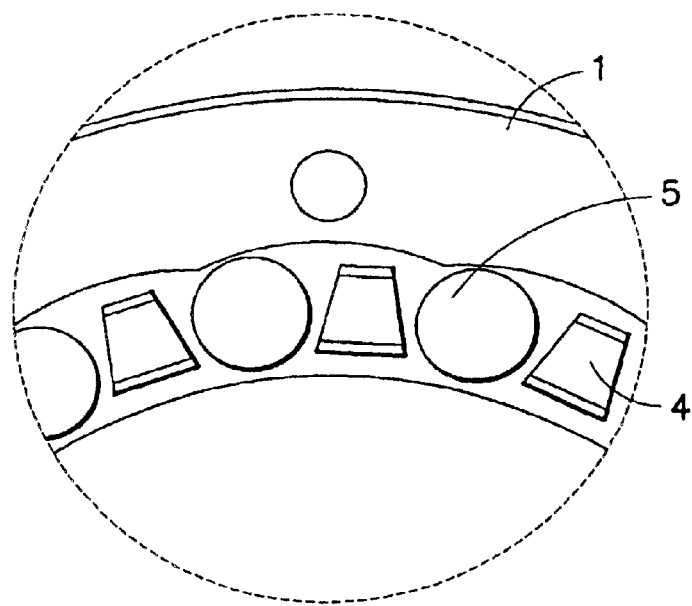

FIG. 2 shows how the fixture breaks down, including all the parts of the device, which, being an orientable model, is the most complex and has the greatest number of parts.

The parts common to all models of the fixture of the invention are a cage body 1, a needle bearing 2, a cover 3, a roller cage 4, rollers 5, a top cover 6 and screws therefor; the manner in which these parts are assembled will now be explained.

The fixture comprises as its basic component the cage body 1, which constitutes the main support body of parts 2 to 7.

Said cage body 1 has a stepped through-hole within which are housed needle bearing 2 and cover 3, which serves as a guard on top of said needle bearing 2, while cage 4 is seated inside said hole and on top of needle bearing 2 and cover 3, which latter components help said part to turn smoothly.

The rollers 5 are inserted into the cavities defined between cage 4 and cage body 1, machined into the interior of which are half-moon-shaped cavities that serve as ramps for the rollers 5.

Disposed in the upper portion of the unit are the top cover 6, which is fastened directly to the cage body 1 by means of screws 7 that pass through each threaded hole. Said top cover 6 prevents dropout of and damage to parts 2 to 5.

The other parts are a turntable 8, screws 9 for fastening turntable 8 to a half-plate 22, a main strut 10, a locking drawbar 11, a locking pull ring 12, a locking drawspring 13, a locking draw body 14, screws 15 for fixing the locking puller, a head 16 for the locking puller, a fastening screw 17 for a dog 18 and turntable 8, a dog 18 for the turntable, an elastic washer 19, a support plate 20, a screw 21 for fastening support plate 20 to main strut 10, a half-plate 22, and screws 23 for fastening half-plate 22 to cage body 1.

FIGS. 3 to 8 show how the rollers 5 travel inside the cavity located between cage 4 and cage body 1, the inner diameter of the mechanism varying as said rollers travel through the half-moon-shaped cavities, automatically fixing the tool holder 24, pincer holder or mill holder seated therein, whether the direction of rotation is clockwise or counterclockwise.

What is claimed is:

1. An improved tool-holder fixture, more specifically for tool holders, pincer holders and mill holders, designed for the mounting and dismounting thereof, characterized essentially in that it comprises a cage body (1) constituting the main support body for a needle bearing (2), a cover (3), a roller cage (4), rollers (5), a top cover (6) and screws (7) for fastening same, said cage body (1) comprising a stepped through-hole within which said needle bearing (2) and said cover (3) are housed, while said cage (4) is received in the interior of said hole and on top of said needle bearing (2) and said cover (3), the latter components facilitating the smooth rotation of roller cage (4), said rollers (5) being suitable to be received in the cavities defined between said cage (4) and said cage body (1), the latter element having, machined therein, plural half-moon-shaped cavities that serve as ramps for said rollers (5), said top cover (6) being disposed in the upper portion of the unit and being fastened directly to said cage body (1) by means of said screws (7).

2. The improved tool-holder fixture as recited in claim 1, characterized in that said rollers (5) are able to travel inside the cavity located between said cage (4) and said cage body (1), the inner diameter of the mechanism varying as said rollers travel through the half-moon-shaped cavities, automatically fixing said tool holder (24), pincer holder or mill holder housed therein, whether the direction of rotation is clockwise or counterclockwise.

\* \* \* \* \*